United States Patent
Chisholm

(10) Patent No.: US 12,077,469 B2
(45) Date of Patent: Sep. 3, 2024

(54) METHOD FOR APPLYING A PRIMER COATING TO GLASS CONTAINERS

(71) Applicant: Owens-Brockway Glass Container Inc., Perrysburg, OH (US)

(72) Inventor: Brian Chisholm, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 238 days.

(21) Appl. No.: 17/483,919

(22) Filed: Sep. 24, 2021

(65) Prior Publication Data

US 2023/0101908 A1 Mar. 30, 2023

(51) Int. Cl.
C03C 17/38 (2006.01)
C03C 17/36 (2006.01)

(52) U.S. Cl.
CPC .......... C03C 17/38 (2013.01); C03C 17/3684 (2013.01); C03C 2217/21 (2013.01); C03C 2217/72 (2013.01); C03C 2218/112 (2013.01); C03C 2218/119 (2013.01); C03C 2218/152 (2013.01)

(58) Field of Classification Search
CPC ...................................................... C03C 17/38
See application file for complete search history.

(56) References Cited

U.S. PATENT DOCUMENTS

| | | | |
|---|---|---|---|
| 5,314,534 A | 5/1994 | Giersberg et al. | |
| 6,037,012 A | 3/2000 | Lourman | |
| 6,096,394 A | 8/2000 | Jenkner et al. | |
| 6,363,749 B1 | 4/2002 | Jenkner et al. | |
| 6,403,175 B1 * | 6/2002 | Speier | C03C 17/30 427/535 |
| 10,752,538 B1 * | 8/2020 | Chisholm | C03B 9/193 |
| 2013/0334089 A1 * | 12/2013 | Remington, Jr. | C03C 17/366 427/126.3 |
| 2018/0312711 A1 | 11/2018 | Zha et al. | |
| 2019/0203352 A1 * | 7/2019 | Katori | C03C 17/32 |
| 2019/0367769 A1 | 12/2019 | Zha et al. | |

FOREIGN PATENT DOCUMENTS

| | | | | |
|---|---|---|---|---|
| EP | 3375762 A1 | | 9/2018 | |
| GB | 2147288 A | * | 5/1985 | ............. C03C 17/42 |
| JP | 4353645 B2 | | 10/2009 | |
| TW | 201410631 A | * | 3/2014 | ........... C03C 17/005 |
| WO | 2011127294 A1 | | 10/2011 | |

OTHER PUBLICATIONS

PCT Int. Search Report and Written Opinion, Int. Serial No. PCT/US2022/044252, Int. Filing Date: Sep. 21, 2022, Applicant: Owens-Brockway Glass Container Inc., Dated: Mar. 27, 2023.

* cited by examiner

*Primary Examiner* — Cynthia Szewczyk

(57) ABSTRACT

A method of manufacturing a glass container in preparation for direct digital printing includes forming a glass container having a glass wall and applying a primer coating to the glass container. The primer coating is applied by directing an atomized spray of an aqueous primer composition onto the glass container over an adherent base layer, such as a hot-end coating, which deposits the primer coating, followed by heating the primer coating with a heat source such as a flame. Upon being heated, the clarity of the primer coating is increased. As a result, a decorative marking may be printed onto the glass container without having to pretreat the glass container in a way that involves pyrolytically depositing a layer of silicon dioxide onto the glass container prior to printing.

22 Claims, 5 Drawing Sheets

METHOD FOR APPLYING A PRIMER COATING TO GLASS CONTAINERS

The present disclosure relates to the manufacture of a hollow glass container and, more specifically, to the application of a primer coating onto a glass container in preparation for digital decorative printing.

BACKGROUND

A glass container such as a bottle or jar is typically formed from molten glass that is produced in a furnace or melter from a vitrifiable batch material. The molten glass is fined to reduce its bubble content and thermally conditioned to bring the molten glass to the correct forming viscosity. An individual charge or "gob" of fined and thermally conditioned molten glass is then delivered to a glass container forming machine where the glass charge is press or blown into a partially-formed container, also known as a parison, followed by a final forming step in which the parison is blown and enlarged into the finished container. Other less prevalent techniques may also be used to form a glass container including those that employ compression or molding practices to form the final container. After being formed, the glass container is usually annealed to relieve residual internal strain that may have been introduced during forming. The annealing process involves conveying the glass container on a conveyor through an annealing lehr to reheat the glass to a temperature above its annealing point and to then gradually reduce the temperature of the glass to below its strain point.

One or more coatings may be applied to the glass container after forming. The applied coating(s) may serve a variety of purposes such as strengthening the glass, protecting the container from contact with other containers, blocking UV light, or providing a base layer for another subsequently applied coating. One example of a conventional set of applied coatings includes a "hot-end coating" (HEC) and a "cold-end coating" (CEC). A HEC is a metal oxide layer, such as tin oxide or titanium oxide, that is applied directly to the exterior surface of the glass container by chemical vapor deposition soon after the glass container is formed. The HEC is applied by exposing the glass container to a volatized heat-decomposable metal oxide precursor material such as stannic chloride or MBTC (Monobutyltin trichloride), among other possibilities, while the glass container is at a temperature, such as between 400° C. and 650° C., at which the heat-decomposable precursor coating decomposes into the HEC. The HEC may be applied to the glass container before the entrance of the annealing lehr or in an upstream portion of the annealing lehr where the temperature of the glass container is still elevated enough to the support the chemical vapor deposition process. Typically, the HEC has a thickness ranging from 2 angstroms to 200 angstroms.

The CEC is a layer that includes a wax and/or a complex of fatty acids and is applied over the HEC by way of a liquid carrier or as a vapor. The CEC is applied over the HEC while the glass container is at a temperature below the temperature at which the HEC is applied such as, for example, between 40° C. and 150° C. One example of a commonly-employed CEC is polyethylene wax, which may be applied by spraying an atomized aqueous emulsion of polyethylene wax onto the glass container over the HEC and allowing the water to evaporate. The CEC may be applied to the glass containers past the exit of the annealing lehr or in a downstream portion of the annealing lehr where the temperature of the glass containers is cool enough to support the application of the CEC. After the CEC is applied, the glass container is inspected, packaged, and prepared for shipping. While the HEC and the CEC are the coatings most typically applied to glass containers as part of current container manufacturing operations, it is possible that another coating or combination of coatings may be applied to the glass container as a substitute for the HEC and the CEC.

Direct digital printing is a digital printing process in which an inkjet printer applies a decorative marking of cured ink to the exterior of a glass container. The decorative marking can include text and/or graphics and the cured ink may be applied over a broad color gamut with a high level of individualization being possible for specified groups of glass containers or even on a container-by-container basis. Direct digital printing is an instantly-customizable way to label a glass container and is more adaptive and robust than paper and plastic adhesive labeling, sleeves, and screen- and pad-printing. However, in many current direct digital printing operations, the glass container must be pre-treated before the decorative marking can be applied. For example, when the glass container includes a HEC and a CEC, the pre-treatment commonly involves, first, exposing at least the portion of the exterior surface where printing is desired to a flame produced by combusting natural gas doped with a silane compound. The flame burns off the CEC and pyrolytically deposits a layer of amorphous silicon dioxide onto the glass container over the HEC to improve the surface energy of the container. After flame-silanizing the container, a solvent-based primer coating is applied over the flame-treated portion of the glass container to support strong adherence of the UV-cured ink.

The current digital decorative printing process for a glass container embodies some inefficiencies. The HEC and CEC are applied to the glass container at the glass manufacturing plant in or around the annealing lehr, as discussed above, after which the glass container is packaged and shipped to a separate facility. At the separate facility, the glass container is pre-treated to remove the CEC and apply a primer coating, and a UV curable ink composition is printed over the primer coating and then UV-cured into the cured ink that constitutes the decorative marking. The digital decorative printing process is thus complicated by the fact that the glass container must first be pretreated to remove the CEC and to improve the surface energy of the HEC. Not only is the pretreatment process an extra step that requires time and dedicated equipment, but, if the pretreatment process is not performed correctly, it could result in poor printing outcomes, which introduces another variable into the quality control and assurance measures that need to be considered. The present disclosure describes a method that, in one respect, would simplify the direct digital printing of a glass container by eliminating the need to practice the pretreatment process that is currently performed in advance of printing.

SUMMARY OF THE DISCLOSURE

The present disclosure relates to a method for manufacturing a glass container that includes an applied primer coating. The primer coating is applied over an adherent base coating that can adhere to the glass of the glass container and also bind to the primer coating. The adherent base coating may be a hot-end coating that is already present on the glass container and is transparent in appearance. Because the primer coating is applied by the glass manufacturer, there is no need to pre-treat the glass container at a printing or other facility by pyrolytically depositing a layer of $SiO_2$ and then, afterwards, applying a primer coating as is standard in current direct digital printing operations. In this way, the glass container is prepped and ready for direct digital printing upon being shipped from the glass manufacturing facility, which simplifies the printing process, improves printing throughput, and helps ensure consistent and high-quality print applications.

The disclosed method involves applying the primer coating in a primer coating step. The primer coating step is performed after forming a glass container and applying the adherent base coating, which may be and typically is a HEC, although other materials may be employed. The adherent base coating may be applied over the entire exterior surface of the glass container or it may be applied over only a portion of the exterior surface. And while the primer coating step may be performed in various ways, a preferred approach comprises two substeps: (1) spraying an aqueous primer composition onto the glass container over the adherent base coating to deposit the primer coating and (2) heating the primer coating to increase its clarity and render the primer coating transparent. The primer coating may be heated in various ways. Preferably, the primer coating is flame-treated, although other options are certainly feasible including heating with UV energy or a flow of hot air.

The present disclosure embodies a number of aspects that can be implemented separately from or in combination with each other to provide a method for producing glass. According to one embodiment of the present disclosure, a method of manufacturing a glass container includes several steps. One step involves forming a glass container that comprises a glass wall having an exterior surface. The glass wall encloses an interior containment space and defines an opening to the interior containment space. Another step of the method involves applying an adherent base coating to at least a portion of the exterior surface of the glass wall of the glass container. Still another step of the method involves directing an atomized spray of an aqueous primer composition onto the glass container over the adherent base coating to deposit a primer coating over the adherent base coating. Yet another step of the method involves heating the primer coating deposited over the adherent base coating to increase a clarity of the primer coating.

According to another aspect of the present disclosure, a method of manufacturing a glass container includes several steps. One step of the method involves forming a glass container that comprises a glass wall having an exterior surface. The glass wall encloses an interior containment space and defines an opening to the interior containment space. Another step of the method involves annealing the glass container, which includes reheating the glass container to raise a temperature of the glass wall and then cooling the temperature of the glass wall at a defined rate. Still another step of the method involves applying a hot-end coating directly to the exterior surface of the glass wall of the glass container either before or during annealing. The hot-end coating comprises a metal oxide and is applied to the exterior surface of the glass wall by decomposing a heat-decomposable metal oxide precursor material onto the exterior surface of the glass wall. Yet another step of the method involves applying a transparent primer coating directly to the hot-end coating. The primer coating comprises an acrylic acid polymer. The hot-end coating and the primer coating are the only two coatings applied to the glass container.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

A method of manufacturing a glass container that includes an adherent base coating and a primer coating applied over the adherent base coating is disclosed. The adherent base coating is preferably a HEC. The HEC, which may be a metal oxide coating, is applied directly to an exterior surface of the glass container by chemical vapor deposition of a volatized heat-decomposable metal oxide precursor material. This may involve exposing the glass wall of the container to the volatized heat-decomposable metal oxide precursor material when the glass wall is at a temperature, such as between from 400° C. to 650° C., at which the precursor material decomposes into the metal oxide coating. The primer coating, which is transparent and may comprise an acrylic acid polymer, is applied directly over the adherent base coating from an aqueous primer composition. The aqueous primer composition may be applied when the temperature of the glass wall of the container ranges from 65° C. to 115° C. or, more narrowly, from 80° C. to 100° C. Upon its initial application, however, the primer coating is hazy. To increase the clarity and transparency of the primer coating, the primer coating is heated, preferably by a flame. A traditional cold-end coating that includes a polyethylene wax or a complex of fatty acids is typically not included on the glass container either between the adherent base coating and the primer coating or over the primer coating.

The primer coating is applied at the glass container manufacturing plant where the glass container is formed. After the glass container has been annealed and the primer coating applied and rendered transparent, the glass container is inspected and packaged along with other similarly manufactured glass containers. The glass container is then shipped to a different facility that is not part of the glass manufacturing plant. This other facility may be a direct digital printing facility, which may be part of or separate from the site where the container is filled with its internal contents such as carbonated beverages, spirits, wine, beer, or some other liquid or solid material for a wide variety of industries including, for example, the food and beverage industry. Once at the separate facility, the glass container may be subjected to direct digital printing with minimal delay, if any, while completely avoiding the need to pre-treat the glass container with techniques that use a flame, for example, to burn off a conventional wax or fatty acid CEC and to pyrolytically deposit a layer of $SiO_2$ over the existing HEC. The direct digital printing process—through which a decorative marking comprised of a cured ink is applied to the glass container over the primer coating—is thus simplified and more amenable to a high-throughput printing process while helping to ensure repeatable high-quality printing.

Figure 1:
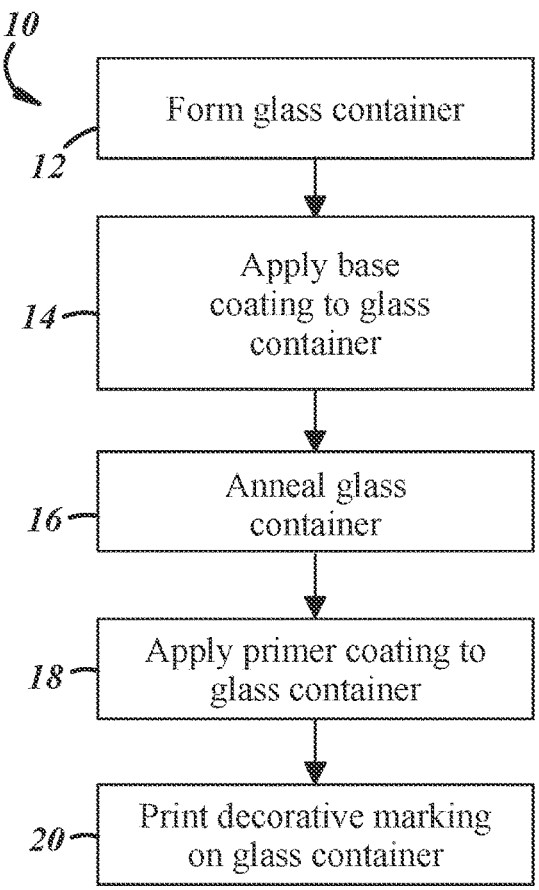
FIG. 1 is a flow chart illustrating a method of manufacturing a glass container according to one embodiment of the present disclosure.
Figure 2:
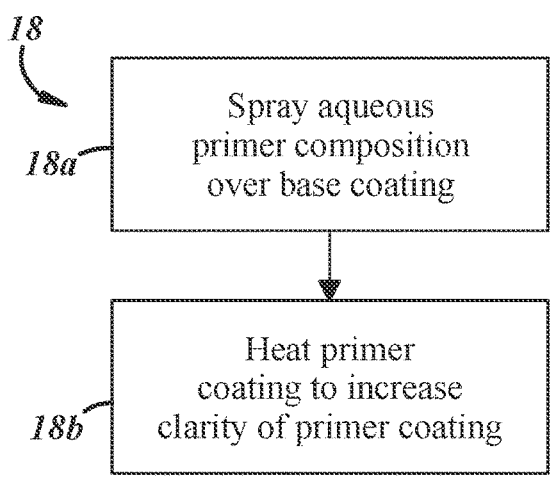
FIG. 2 is a flow chart illustrating the substeps of the primer coating step shown in FIG. 1.
Figure 3:
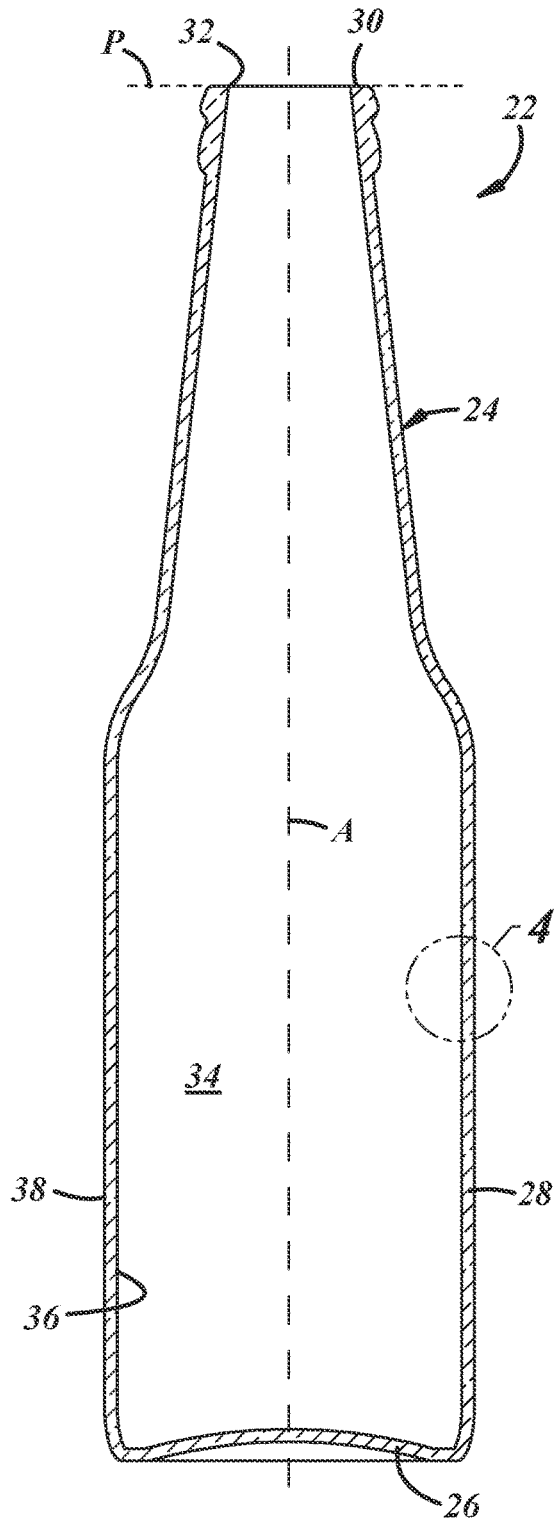
FIG. 3 is a side cross-sectional view of a representative glass container that has been formed and coated with an adherent base coating and a primer coating according to one embodiment of the present disclosure.
Figure 4:
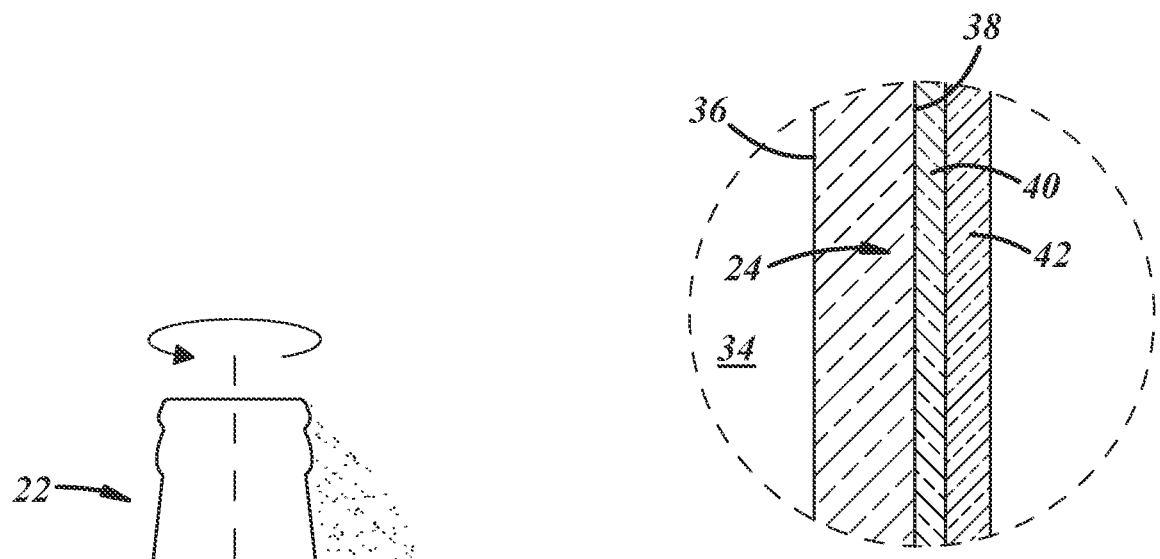
FIG. 4 is magnified cross-sectional view of a portion of the glass container shown in FIG. 3, with the adherent base coating and the primer coating being shown as idealized layers and not necessarily to scale, according to one embodiment of the present disclosure.

Referring now to FIGS. 1-2, the method of manufacturing a glass container 10 is shown by way of flow diagrams. Various steps of the disclosed method 10 are supplemented with one or more schematic illustrations depicted FIGS. 3-9. The method 10 includes a glass container forming step 12, a coating step 14, an annealing step 16, and a primer coating step 18. These steps 12, 14, 16, 18 are preferably performed by the glass container manufacturer at a glass container manufacturing plant. A direct digital printing step 20 is also shown in FIG. 1 as an additional but non-mandatory step in the disclosed method 10 since the printing step 20 is preferably performed at a facility other than the glass manufacturing plant such as, for example, a direct digital printing facility, which may or may not be part of a bottling plant. In a manufacturing setting, the method 10 is most likely to be practiced in connection with a plurality of glass containers for operational efficiency and economic reasons.

In the glass container forming step 12, a glass container 22 is formed by any suitable process, many of which are well known to those skilled in the art. The glass container 22 comprises a glass wall 24 that includes an axially-closed base 26 and a circumferential body 28 as depicted generally in FIGS. 3-4. The circumferential body 28 extends axially along a central longitudinal axis A of the container 22 from a periphery of the axially closed base 26 to a mouth 30 that defines an opening 32 to an internal containment space 34 enclosed by the glass wall 24. The glass wall 24 includes an interior surface 36 that delineates the internal containment space 34 below an entrance plane P of the opening 32 of the mouth 30 and, additionally, includes an exterior surface 38 outside of the entrance plane P that constitutes the entire surface of the glass wall 24 external to the internal containment space 34. The glass wall 24 may be composed of soda-lime-silica glass or some other type of glass. Soda-lime-silica glass comprises 60 wt % to 80 wt % $SiO_2$, 8 wt % to 18 wt % $Na_2O$, and 5 wt % to 15 wt % CaO, based on the total weight of the glass, and may further include additional oxide and non-oxide constituents including, most commonly, up to 2 wt % of $Al_2O_3$ based on the total weight of the glass. The chemistry of a typical soda-lime-silica glass is shown below in Table 1 although the full extent of all possible materials that may be present in the glass is not listed.

TABLE 1

Soda-Lime-Silica Glass Chemistry

| Component | Weight % | Raw Material Source(s) |
| --- | --- | --- |
| $SiO_2$ | 60-80 | Quartz sand |
| $Na_2O$ | 8-18 | Soda ash |
| CaO | 5-15 | Limestone |
| $Al_2O_3$ | 0-3 | Nepheline Syenite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Fluorines are a contaminant |

The glass container 22 is preferably formed from a vitrifiable batch material that includes a physical mixture of virgin raw materials and, optionally, recycled glass (often referred to in the glass industry as "cullet"). The virgin raw materials included in the vitrifiable batch material may include quartz sand (a source of $SiO_2$), soda ash or sodium carbonate (a source of $Na_2O$), and limestone or calcium carbonate (a source of CaO) as well as others such as those listed above in Table 1. The vitrifiable batch material may also include glass intermediates and other precursors. However formulated, the vitrifiable batch material is melted in a continuous melting furnace or a melter, such as a submerged combustion melter, to produce molten glass. The molten glass is then fined to remove entrained gas bubbles from the glass. The fined glass is then conditioned in a forehearth, for example, to achieve thermally homogenized glass having a viscosity that enables subsequent glass-forming operations. From there, a charge or gob of conditioned molten glass may be delivered to a glass container forming machine that includes a blank mold and a blow mold. The gob is pressed or blown into a parison within a blank mold, which is then transferred to the blow mold where the parison is blown into the glass container 22 having the shape and configuration described above. After being formed, the glass container 22 is transferred to a conveyor or other transport device.

The glass container 22 formed in the glass container forming step 12 is then subjected to the coating step 14. There, a hot-end coating or HEC 40 is preferably applied over the exterior surface 38 of the glass wall 24 of the glass container 22 as the adherent base coating, although one or more other coatings may be applied to help bind the primer coating to the glass wall 24 of the container 22. The HEC 40 is shown schematically in FIG. 4 and is not necessarily drawn to scale in relation to the thickness of the glass wall 24. The HEC 40 is comprised of a metal oxide such as, for example, tin oxide or titanium oxide, and is applied directly to the exterior surface 38 of the glass wall 24 by chemical vapor deposition. In a common practice, the glass container 22 is transported through a hot-end coating hood or tunnel while the glass wall 24 is still hot from the preceding forming operation and is exposed to a volatized (i.e., in vapor form) heat-decomposable metal oxide precursor material such as stannic chloride or MBTC (for a tin oxide HEC). The glass wall 24, when exposed to the heat-decomposable metal oxide precursor material, may, for example, be at a temperature that ranges from 400° C. to 650° C. The volatized heat-decomposable metal oxide precursor material decomposes upon contact with the heated glass wall 24 of the glass container 22 and deposits a conformal layer of the derived metal oxide that constitutes the HEC 40. The HEC 40 typically has a thickness that ranges from 2 angstroms to 200 angstroms. Of course, other techniques for applying the HEC 40 to the exterior surface 38 of the glass container 22 may be employed besides CVD.

The glass container manufacturing method 10 also calls for the glass container 22 to be annealed in the annealing step 16 to relieve internal residual strain within the glass wall 24 and thus render the glass container 22 more fracture-proof and shatter-proof. The glass container 22 may be annealed in an annealing lehr. An annealing lehr is an elongated kiln having an end-to-end temperature gradient through which the glass container 22 is transported on rollers, a conveyor belt, or some other device that can transport the container 22 through the lehr. When transported through the annealing lehr from the entrance of the lehr to the exit of the lehr during the annealing step 16, the glass container 22 and, in particular, the glass wall 24, is reheated and then cooled at a defined and controlled rate. The glass container 22 is first heated to a temperature above the annealing point of the glass, which for soda-lime-silica glass usually lies within the range of 510° C. to 550° C., followed by slowly cooling the container at a rate of 1° C./min to 10° C./min to a temperature below the strain point of the glass, which for soda-lime-silica glass usually lies within the range of 470° C. to 500° C. The glass container 22 may be cooled rapidly after it has been cooled to a temperature below the strain point.

The coating step 14 and the annealing step 16 may be separated temporally or they may overlap. In that regard, when the adherent base coating includes the HEC 40, the HEC 40 may be applied to the exterior surface 38 of the glass wall 24 of the container 22 either before or during annealing. For example, in one implementation, which is the preferred approach, the coating hood or tunnel within which the HEC 40 is applied may be positioned upstream of the entrance to the annealing lehr. Under these circumstances, the glass container 22 would emerge from the coating hood or tunnel with the HEC 40 applied and then enter and pass through the annealing lehr. In an alternative implementation, however, the coating hood or tunnel may be positioned within un upstream portion of the annealing lehr at a location where the glass container 22 is at a temperature that still supports application of the HEC 40. Under these circumstances, the glass container 22 would enter the annealing lehr without the HEC 40, but the HEC 40 would be applied relatively soon as the glass container 22 passes through the coating hood or tunnel, which is integrated into the annealing lehr. The glass container 22 would then continue its progress through the annealing lehr after the HEC 40 is applied.

The primer coating step 18 is performed after the annealing step 16. In the primer coating step 16, a primer coating 42, which is transparent, is applied to the glass container 22 over the adherent base coating, which, here, is the HEC 40. The primer coating 42 is shown schematically in FIG. 4 and is not necessarily drawn to scale in relation to the thickness of the glass wall 24 or the thickness of the HEC 40. The primer coating 42 may comprise an acrylic acid polymer as the largest component on a weight percent basis and, typically, has a thickness of up to 200 μm or, more narrowly, from 1 μm to 200 μm or from 1 μm to 100 μm. An acrylic acid polymer is any homopolymer or heteropolymer that includes a monomeric unit derived from acrylic acid or methacrylic acid including, for example, ethylene-acrylic acid copolymer (EAA, formula 1 below). In certain embodiments, such as the one shown in FIGS. 3-4, the glass container 22 includes only two coatings applied over the exterior surface 38 of the glass wall 24; that is, the HEC 40 and the primer coating 42. In that sense, the HEC 40 and the primer coating 42 are disposed immediately adjacent to one another, in that order, over the exterior surface 38 of the glass wall 24 while a cold-end coating that contains a polyethylene wax or a complex of fatty acids is not present on the container 22. The primer coating step 18 includes two substeps as shown in the flow chart provided in FIG. 2: (1) the primer coating application substep 18a and (2) the heating substep 18b.

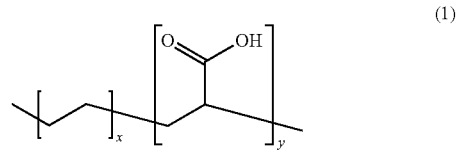

(1)

Figure 5:
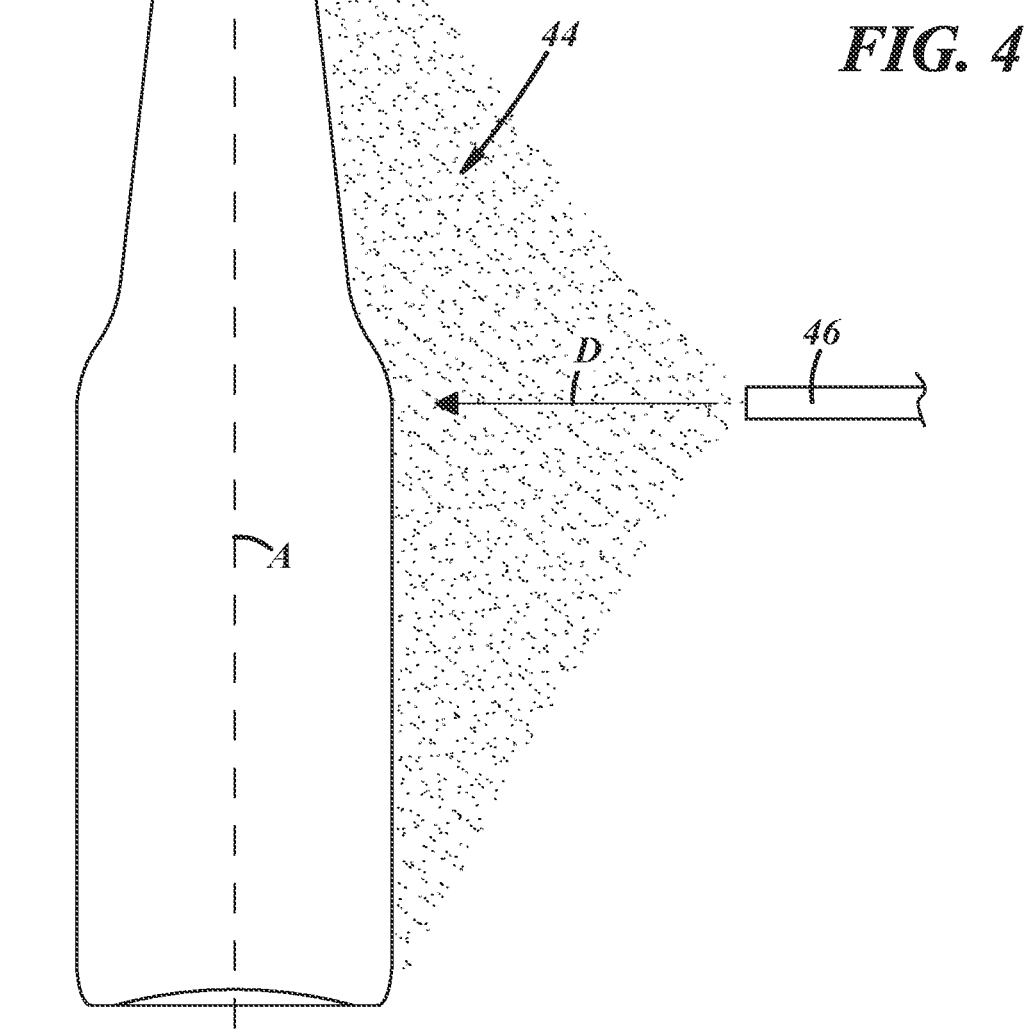
FIG. 5 is a side elevational view of a glass container during application of an aqueous primer composition to the container during the primer coating step included in the flow chart of FIG. 1 according to one embodiment of the present disclosure.

With reference now to FIG. 5, the primer coating application substep 18a involves directing an atomized spray 44 of an aqueous primer composition onto the glass container 22 over the HEC 40. The aqueous primer composition comprises a dispersion of the acrylic acid polymer in water, typically at 0.5 wt % to 10 wt % solids, and is directed onto the glass container 22 through an atomizer nozzle 46 as the atomized spray 44. The temperature of the glass wall 24 preferably ranges from 65° C. to 115° C. when the aqueous primer composition is applied onto the HEC 40. The atomized spray 44 presents droplets of the acrylic acid polymer dispersion that have droplet sizes of 500 μm or less with at least 90% of the droplets having droplet sizes of 300 μm or less or, more narrowly, of 100 μm or less. The droplet sizes of the droplets in the atomized spray 44 can be influenced by a variety of factors. In general, for example, the droplet size can be reduced by increasing the spray angle of the atomized spray 44, the nozzle selection (e.g., full cone, flay spray, or hollow cone nozzle), increasing the pressure of the atomizer nozzle 46, and altering the properties of the aqueous primer composition including the viscosity and specific gravity of the composition. Skilled artisans will know how to manage the droplet sizes of the aqueous primer composition droplets emitted from the atomizer nozzle 46.

In addition to the fine droplet sizes attributed to the atomized spray 44, and to further help apply the aqueous primer composition uniformly to the glass container 22, the aqueous primer composition includes 5 wt % or less of the acrylic acid polymer and is sprayed through the atomizer nozzle 46 at a flow rate ranging from 1.0 L/hour to 3.0 L/hour. The flow rate of the aqueous primer composition through the atomizer nozzle 46 can also affect the droplet size of the droplets in the atomized spray 44 as increasing the flow rate generally results in increasing the droplet sizes and vice versa. The glass container 22 is also preferably rotated about its longitudinal axis A within the atomized spray 44 through at least two full rotations, and even more preferably through at least three or four full rotations, with a mean spray direction D of the atomizer nozzle 46 being oriented perpendicular to the longitudinal axis A of the container 22 within a tolerance of 10° to help ensure that the HEC 40 is completely and evenly covered by the aqueous primer composition.

As droplets of the aqueous primer composition make contact with the glass container 22 and, more specifically, the adherent base coating (here, the HEC 40), while the glass wall 24 is still relatively hot, the water component of the aqueous primer composition evaporates and the residual acrylic acid polymer is retained on and adhered to the container 22 as the primer coating 42. The fine droplets of the aqueous primer composition included in the atomized spray 44 deposit the primer coating 42 quickly and, due to their fine droplet sizes, are able to resist coalescing into larger droplets that may run down the container 22 and create streaks. As the droplets of the aqueous primer composition establish the primer coating 42 on the glass container 22, however, air and water inevitably become trapped within the residual acrylic acid polymer and become part of the primer coating 42. The trapped air and water impair the optical clarity of the primer coating 42 as initially deposited and cause the primer coating 42 to appear hazy or translucent. A hazy appearance to the primer coating 42 may not be acceptable. Consequently, the primer coating 42 preferably needs to have its clarity increased. The clarity may be increased—or, in other words, the haze percentage, as defined below, is decreased—to render transition the primer coating 42 from hazy to transparent. This modification of the optical clarity of the primer coating 42 is accomplished in the heating substep 18b of the primer coating application step 18.

Figure 6:
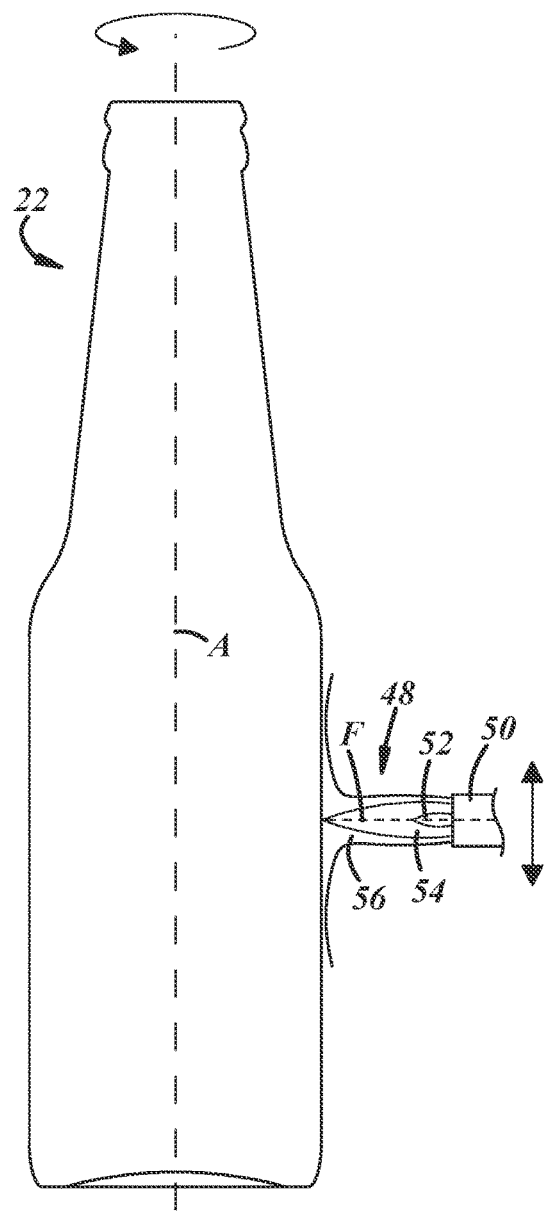
FIG. 6 is a side elevational view of a glass container during heating by flame-treatment of the primer coating during the primer coating step included in the flow chart of FIG. 1 according to one embodiment of the present disclosure.

The heating substep 18b involves heating the primer coating 42 with a heat source. In one approach, the heating substep 18b comprises exposing the primer coating 42 to a flame 48 emitted from a burner 50, as shown in FIG. 6. The flame 48 extends lengthwise along a central flame axis F and is preferably a non-luminous flame produced by combusting an alkane-based fuel with an oxidant. The alkane-based fuel may be (1) natural gas that comprises 95 wt % or greater of methane or (2) propane. The flame 48 has a flame anatomy that includes a primary reduced combustion zone 52 where incomplete combustion is occurring, an interconal zone 54 surrounding the primary combustion zone 52, and a secondary oxidized combustion zone 56 surrounding the interconal zone 54 where complete combustion is occurring, all of which extend along the central flame axis F. The temperature of the flame 48 is typically the greatest at the tip of the primary reduced combustion zone 52. For instance, when air is the oxidant, the peak temperature of the flame 48 may range from 1000° C. to 1560° C. The primer coating 42 is exposed to the flame 48—preferably with the flame central axis F being oriented perpendicular to the longitudinal axis A of the container within a tolerance of 10° and with the tip of the primary combustion zone 52 contacting the primer coating 48—to heat the primer coating 42 and release any trapped air and water. This may involve heating the primer coating 42 to a temperature that ranges from 100° C. to 150° C., particularly if the primer coating 42 includes EAA as the acrylic acid polymer.

In one particular implementation of flame treatment heating, as shown here in FIG. 6, the glass container 22 may be rotated about its longitudinal axis A through at least two full rotations, and preferably through at least three to five full rotations, while the burner 50 that emits the flame 48 is oscillated along a vertical path parallel to the longitudinal axis A of the container 22. The central flame axis F of the flame 48 may remain oriented perpendicular to the longitudinal axis A of the glass container 22, as described above, over the course of the vertical oscillations. The rotation of the glass container 22 in conjunction with the oscillation of the burner 50 ensures that the entire primer coating 42 as applied to the glass container 22 is heated equally to drive off the trapped air and water remnants. By removing the trapped air and water remnants through heating and flame exposure, the clarity of the primer coating 42 is increased (or the haze percentage is decreased) and, eventually, the primer coating 42 transitions from hazy and translucent as originally deposited onto the glass container 22 to transparent. The primer coating 42 is considered transparent when it exhibits a haze percentage, as determined by the standard test described in ASTM D1003-21 Procedure B (2021), of 10% or less or, more narrowly, of 5% or less. In a preferred approach, the primer coating 42 is considered transparent when it exhibits a haze percentage of 3% or less or, more narrowly, of 2% or less.

Figure 9:
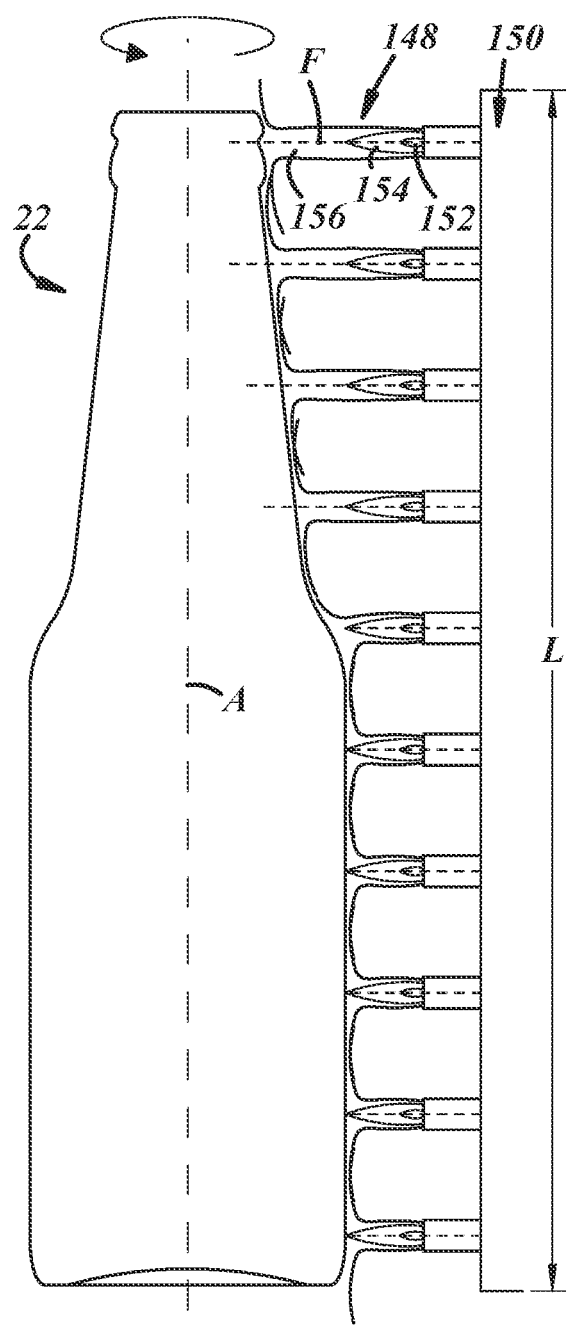
FIG. 9 is a side elevational view of a glass container during heating by flame treatment of the primer coating during the primer coating step included in the flow chart of FIG. 1 according to another embodiment of the present disclosure.

In another implementation of flame treatment heating, a ribbon burner 150 that emits a plurality of flames 148, as shown in FIG. 9, may be used to heat the primer coating 42. The plurality of flames 148 is spaced along a length L of the ribbon burner 150. When in use, the ribbon burner 150 is positioned next to the glass container 22 and the length L of the burner 150 may be oriented parallel to the longitudinal axis A of the container 22 or the length L of the burner 150 may be rotated within a plane that is parallel to the longitudinal axis A by an angle that ranges from 1° to 80° from parallel in either angular direction. The glass container 22 may be rotated about its longitudinal axis A through at least two full rotations, and preferably through at least three to five full rotations, while the ribbon burner 150 remains stationary. The length L of the ribbon burner 150 and the number of flames 148 emitted from the burner 150 are adequate to ensure that the entire primer coating 42 is exposed to the flames 148 and heated as the container 22 is rotated through the flames 48. And, as before, the heating of the primer coating 42 drives off water and air remnants that are trapped within the coating 42 to transition the coating 42 from hazy and translucent as originally deposited to transparent.

After the adherent base coating and the primer coating 42 have been applied, and with the primer coating 42 now exhibiting a transparent appearance, the glass container 22 is ready for printing. The glass container 22 along with many other similar containers that have undergone the same processing may be inspected, packaged, and shipped from the glass manufacturing plant. The glass container 22 may be subjected to the direct digital printing step 20 at a separate facility upon being received directly from the glass manufacturing plant or an intermediate distributor. And, because the primer coating 42 is stable, the glass container 22 may be stored for extended periods, if desired, before being printed. In the direct digital printing step 20, and with reference now to FIGS. 7-8, a decorative marking 58 (FIG. 8) is applied to the glass container 22 over the primer coating 42. The decorative marking 58 comprises a cured ink 60 that may include text, graphics, or a combination of both text and graphics. The cured ink 60 may be unicolored or multicolored and the color or colors may be selected from a broad color gamut. The decorative marking 58 is resistant to water, light, and scratching and may be printed onto the glass container 22 by a digital inkjet printer. A variety of digital inkjet printers that can print onto the rounded contour of the glass container 22 are commercially available.

Figure 7:
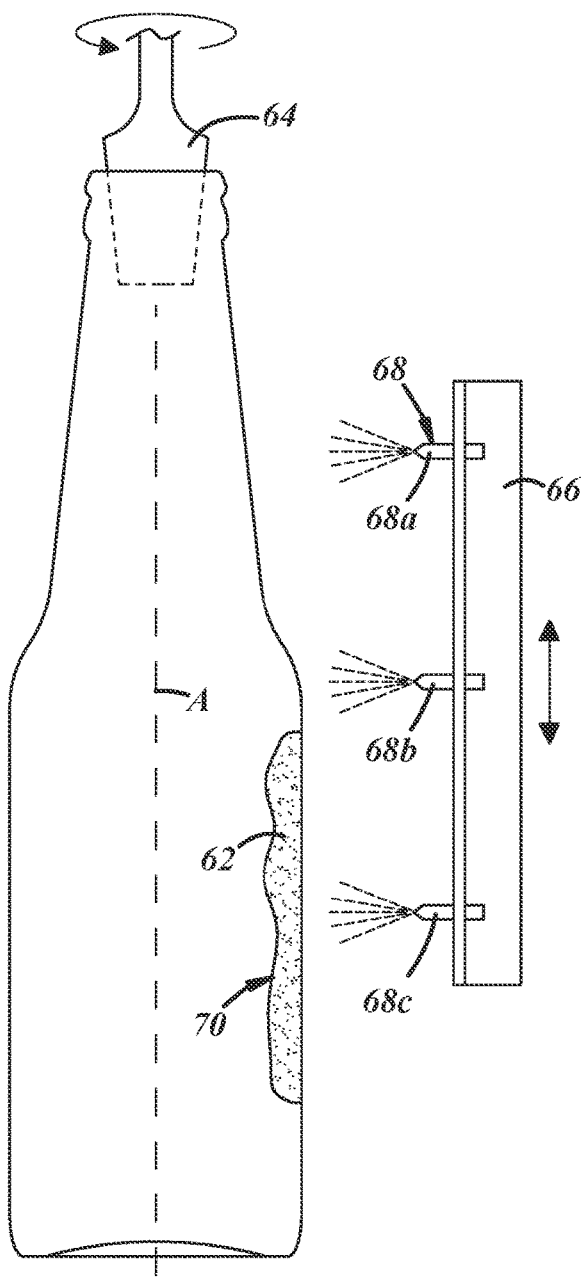
FIG. 7 is a schematic depiction of a print head of an inkjet printer that is applying a UV-curable ink composition to a glass container during the direct digital printing step included in the flow chart of FIG. 1 according to one embodiment of the present disclosure.

The direct digital printing step 20 involves first depositing a UV-curable ink composition 62 onto the glass container 22 over and in contact with the primer coating 42 as shown schematically in FIG. 7. The glass container 22 may be conveyed to the digital printer on a print bed (now shown) and supported rotatably on a rotary attachment 64 that fits within the glass container 22 through the opening 32 of the mouth 30. Once located within the printer, a print head 66 that includes one or more ink nozzles 68 deposits the UV-curable ink composition 62 onto the glass container 22 while the container is rotated about its longitudinal axis A if needed. The print head 66 is computer-controlled and deposits the UV-curable ink composition 62 at high resolution into a defined decorative pattern 70 that replicates the decorative marking 58 based on a digital file stored on the computer. The UV-curable ink composition 62 as deposited onto the glass container 22 in the defined decorative pattern 70 may be distributed from more than one ink nozzle 68. For example, a first ink nozzle 68a may disseminate a portion of the ink composition 62 that is white while a second ink nozzle 68b may disseminate a portion of the ink composition 62 that is black or any of a wide variety of colors. The white portion of the ink composition 62 may be sourced from a white ink cartridge while the black portion and/or the colored portion may be sourced from one or a plurality of a group of ink cartridges that follow the CMYK or the CcMmYK color model. Additionally, if desired, a third ink nozzle 68c may disseminate a varnish that covers the defined decorative pattern 70 of the UV-curable ink composition 62.

The UV-curable ink composition 62 may comprise one or more polymerizable compounds, one or more pigments to provide color, and one or more photoinitiators that initiate photopolymerization of the polymerizable compound(s) when the UV-curable ink composition 62 is exposed to UV light. The one or more polymerizable compounds may include, for example, polymerizable acrylate compounds, which, here, encompass unsaturated compounds that have acrylate unsaturation (formula 2 below) or methacrylate unsaturation (formula 3 below). These polymerizable compounds may include monofunctional and multifunctional acrylate monomers, monofunctional and multifunctional methacrylate monomers, monofunctional and multifunctional acrylated oligomers, and monofunctional and multifunctional methacrylated oligomers, any one or more of which may be included in the UV-curable ink composition 62 deposited onto the glass container 22 in the defined decorative pattern 70. Other types of polymerizable compounds besides polymerizable acrylate compounds may also be included in the UV-curable ink composition 62 including, for example, unsaturated compounds that have vinyl or allyl unsaturation. The varnish that may be applied over the defined decorative pattern 70 may be clear ink and, thus, it may be composed similarly to the UV-curable ink composition with the exception that the varnish lacks one or more pigment(s).

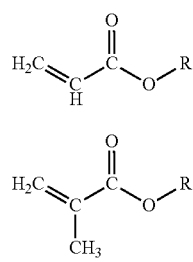

(2)

(3)

Figure 8:
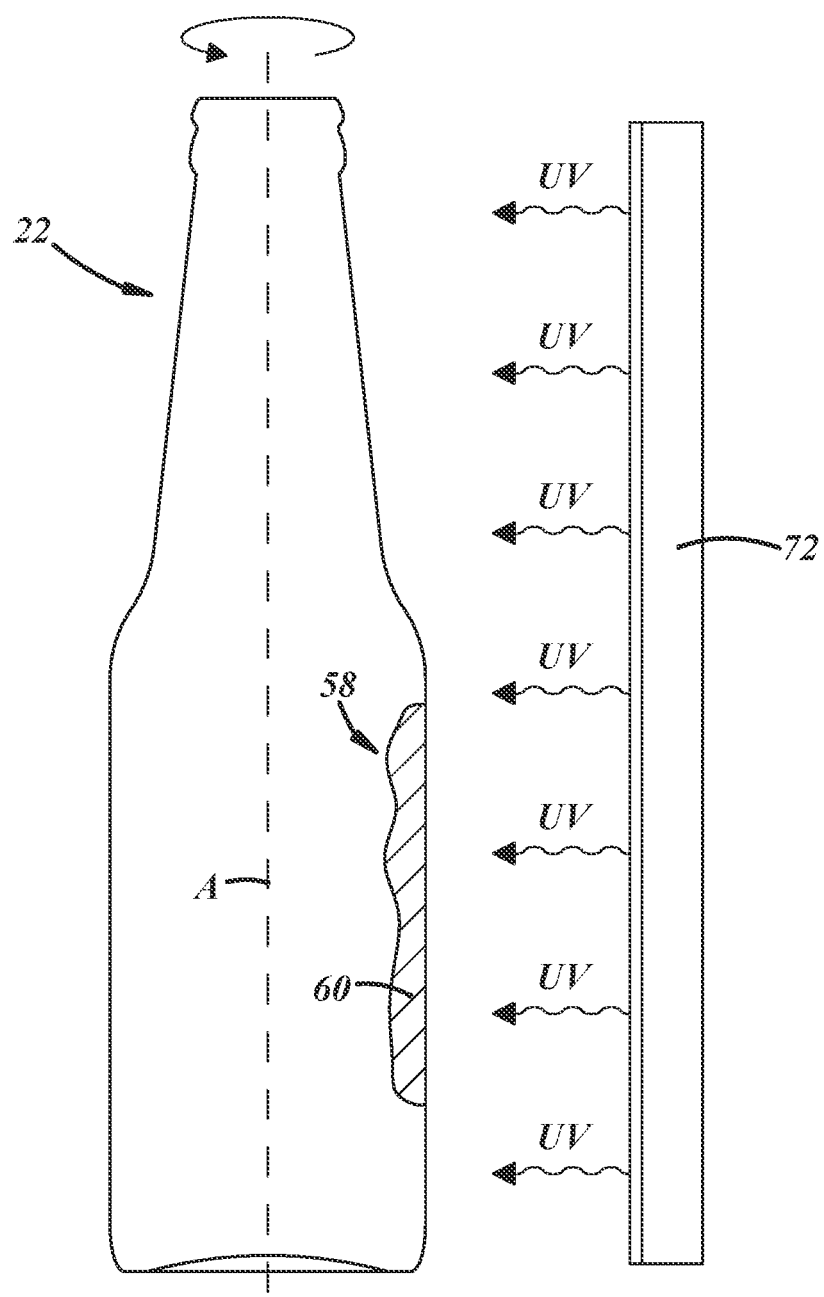
FIG. 8 is a schematic illustration of a glass container during UV-curing of the applied UV-curable ink composition to form the cured ink that constitutes a decorative marking on the glass container during the direct digital printing step included in the flow chart of FIG. 1 according to one embodiment of the present disclosure.

After the UV-curable ink composition 62 and the optional overlying varnish are applied to the glass container 22, and as depicted in FIG. 8, the defined decorative pattern 70 of the UV-curable ink composition and the optional varnish are exposed to UV light (i.e., ultraviolet light) and cured. The UV light is emitted from a UV light source 72 that may include one or more UV-LED lights, one or more mercury vapor lamps, a combination of one or more UV-LED lights and one or more mercury vapor lamps, or some other source of UV light. Upon exposure to the UV light, the photoinitiators included in the UV-curable ink composition 62 (and the optional varnish) produces a reactive species, such as a free radical, that initiates polymerization and cross-linking of the one or more polymerizable compounds to form the cured ink 60 and, thus, the decorative marking 58 that comprises the cured ink 60. The varnish, if present, is likewise cured over the decorative marking 58. The exposure of the defined decorative pattern 70 of the UV-curable ink composition 62 may be performed within the digital printer or adjacent to the digital printer. After the decorative marking 58 has been applied to the glass container 22, the container 22 may be inspected to ensure the marking 58 meets quality standards and then filled with its internal contents and closed with a closure member, such as a cap or lid, that covers the opening 32 of the mouth 30 of the container 22.

There thus has been disclosed a method for manufacturing a glass container in preparation for direct digital printing that satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of manufacturing a glass container, the method comprising:
   forming a glass container that comprises a glass wall having an exterior surface, the glass wall enclosing an interior containment space and defining an opening to the interior containment space;
   applying an adherent base coating over at least a portion of the exterior surface of the glass wall of the glass container;
   directing an atomized spray of an aqueous primer composition, which comprises a dispersion of an acrylic acid polymer in water, onto the glass container over the adherent base coating to deposit a primer coating including the acrylic acid polymer over the adherent base coating; and
   heating the primer coating to release trapped air and water from within the acrylic acid polymer and to increase the clarity of the primer coating.

2. The method set forth in claim 1, wherein the aqueous primer composition is directed onto the glass container when a temperature of the glass wall of the glass container ranges from 65° C. to 115° C.

3. The method set forth in claim 1, wherein applying the adherent base coating comprises applying a hot-end coating to the exterior surface of the glass wall of the glass container by chemical vapor deposition, the hot-end coating including a metal oxide.

4. The method set forth in claim 1, wherein the atomized spray of the aqueous primer composition comprises droplets of the aqueous primer composition, and wherein at least 90% of the droplets have droplet sizes of 300 μm or less.

5. The method set forth in claim 4, wherein at least 90% of the droplets have droplet sizes of 100 μm or less.

6. The method set forth in claim 1, wherein heating the primer coating comprises exposing the primer coating to a flame.

7. The method set forth in claim 1, wherein the primer coating is heated to a temperature between 100° ° C. and 150° C.

8. The method set forth in claim 1, further comprising:
applying a decorative marking comprised of a cured ink to the glass container over the primer coating by direct digital printing.

9. The method set forth in claim 8, wherein applying the decorative marking comprises:
depositing a UV-curable ink composition onto the glass container over the primer coating from a print head that includes one or more nozzles that disseminate the UV-curable ink composition, the UV-curable ink composition being deposited in a defined decorative pattern; and
exposing the defined decorative pattern of the UV-curable ink composition to UV-light to cure the UV-curable ink composition and produce the decorative marking.

10. The method set forth in claim 9, wherein the UV-curable ink composition comprises polymerizable compounds, one or more pigments, and one or more photoinitiators.

11. The method set forth in claim 1, further comprising:
annealing the glass container before directing the atomized spray of the aqueous primer composition onto the glass container.

12. The method set forth in claim 1, wherein the acrylic acid polymer is ethylene-acrylic acid copolymer.

13. A method of manufacturing a glass container, the method comprising:
forming a glass container that comprises a glass wall having an exterior surface;
annealing the glass container including reheating the glass container to raise a temperature of the glass wall and then cooling the glass wall;
applying a hot-end coating directly to the exterior surface of the glass wall of the glass container either before or during annealing, the hot-end coating comprising a metal oxide and being applied to the exterior surface of the glass wall by decomposing a heat-decomposable metal oxide precursor material onto the exterior surface of the glass wall; and
applying a transparent primer coating directly to the hot-end coating, the transparent primer coating comprising an acrylic acid polymer, and wherein the hot-end coating and the primer coating are the only two coatings applied to the glass container.

14. The method set forth in claim 13, wherein applying the transparent primer coating directly to the hot-end coating comprises:
directing an atomized spray of an aqueous primer composition onto the glass container over the hot-end coating to deposit the primer coating over the hot-end coating; and
heating the primer coating deposited over the hot-end coating to release trapped air and water from within the acrylic acid polymer and to increase the clarity of the primer coating.

15. The method set forth in claim 14, wherein the aqueous primer composition comprises a dispersion of the acrylic acid polymer in water.

16. The method set forth in claim 15, wherein the aqueous primer composition comprises 5 wt % or less of the acrylic acid polymer.

17. The method set forth in claim 14, wherein the atomized spray of the aqueous primer composition comprises droplets of the aqueous primer composition, and wherein at least 90% of the droplets have droplet sizes of 300 μm or less.

18. The method set forth in claim 17, wherein at least 90% of the droplets have droplet sizes of 100 μm or less.

19. The method set forth in claim 14, wherein the aqueous primer composition is directed onto the glass container when the temperature of the glass wall of the glass container ranges from 65° C. to 115° C.

20. The method set forth in claim 14, wherein heating the primer coating comprises exposing the primer coating to a flame that is produced by combusting an alkane-based fuel and an oxidant.

21. The method set forth in claim 13, further comprising:
depositing a UV-curable ink composition onto the glass container over the primer coating, the UV-curable ink composition being deposited in a defined decorative pattern; and
exposing the defined decorative pattern of the UV-curable ink composition to UV-light to cure the UV-curable ink composition and produce a decorative marking comprised of a cured ink.

22. The method set forth in claim 13, wherein the acrylic acid polymer is ethylene-acrylic acid copolymer.

* * * * *